US012658508B2

(12) United States Patent
Hwang et al.

(10) Patent No.: US 12,658,508 B2
(45) Date of Patent: Jun. 16, 2026

(54) POUCH FOR SECONDARY BATTERY AND SECONDARY BATTERY COMPRISING THE SAME

(71) Applicant: SK ON CO., LTD., Seoul (KR)

(72) Inventors: Chang Mook Hwang, Daejeon (KR); Jong Hyeok Lee, Daejeon (KR); Yoon Ji Jo, Daejeon (KR)

(73) Assignee: SK ON CO., LTD., Seoul (KR)

( * ) Notice: Subject to any disclaimer, the term of this patent is extended or adjusted under 35 U.S.C. 154(b) by 702 days.

(21) Appl. No.: 17/896,064

(22) Filed: Aug. 25, 2022

(65) Prior Publication Data

US 2023/0066639 A1     Mar. 2, 2023

(30) Foreign Application Priority Data

Aug. 26, 2021     (KR) ........................ 10-2021-0112876

(51) Int. Cl.
*H01M 50/105*        (2021.01)
*H01M 50/14*         (2021.01)
            (Continued)

(52) U.S. Cl.
CPC ......... *H01M 50/105* (2021.01); *H01M 50/14* (2021.01); *H01M 50/178* (2021.01); *H01M 50/186* (2021.01); *H01M 50/193* (2021.01)

(58) Field of Classification Search
CPC .......... H01M 10/0585; H01M 50/105; H01M 50/14; H01M 50/178; H01M 50/186;
            (Continued)

(56) References Cited

U.S. PATENT DOCUMENTS

2009/0197160 A1 *   8/2009   Fujiwara ............. H01M 50/528
                                                            429/129
2014/0154554 A1     6/2014   Kim et al.
2019/0221786 A1 *   7/2019   Robert ................ H01M 10/659

FOREIGN PATENT DOCUMENTS

EP          1202371 A1      5/2002
KR       10-1165066 B1      7/2012
                (Continued)

OTHER PUBLICATIONS

Extended European Search Report for European Patent Application No. 22191980.6, mailed Mar. 6, 2023 (9 pages).
                (Continued)

*Primary Examiner* — Brian R Ohara
*Assistant Examiner* — Brent C Thomas
(74) *Attorney, Agent, or Firm* — Perkins Coie LLP

(57) ABSTRACT

A pouch for a secondary battery having improved stability to an external force and an internal pressure and a secondary battery including the pouch are disclosed. In an aspect, a pouch for a secondary battery implemented based on some embodiments of the disclosed technology includes a pouch cup including a battery cell accommodating portion, a tab receiving portion formed at one end portion of the pouch cup to be in communication with one end of the battery cell accommodating portion, a supporting portion adjacent to the tab receiving portion at the one end portion of the pouch cup to be separated from the battery cell accommodating portion and the tab receiving portion, the supporting portion comprising a plurality of columns in the supporting portion, and a reinforcing film attached on an outer wall of the supporting portion, the reinforcing film including a material different from that of the outer wall of the supporting portion.

16 Claims, 5 Drawing Sheets

(51) Int. Cl.
*H01M 50/178*     (2021.01)
*H01M 50/186*     (2021.01)
*H01M 50/193*     (2021.01)

(58) Field of Classification Search
CPC .. H01M 50/193; H01M 50/30; H01M 50/463;
                                     H01M 50/471
See application file for complete search history.

(56)                  References Cited

FOREIGN PATENT DOCUMENTS

| KR | 10-2013-0021784 A | 3/2013 |
|----|----|----|
| KR | 10-1424003 B1 | 7/2014 |
| KR | 10-2019-0031141 A | 3/2019 |
| KR | 10-2099905 B1 | 4/2020 |
| KR | 10-2021-0051733 A | 5/2021 |

OTHER PUBLICATIONS

Notice of Allowance for Korean Patent Application No. 10-2021-0112876, issued Apr. 20, 2026 (4 pages).

\* cited by examiner

POUCH FOR SECONDARY BATTERY AND SECONDARY BATTERY COMPRISING THE SAME

PRIORITY CLAIM AND CROSS-REFERENCE TO RELATED APPLICATION

This patent document claims the priority and benefits of Korean Patent Application No. 10-2021-0112876 filed in the Korean Intellectual Property Office (KIPO) on Aug. 26, 2021, the entire disclosure of which is incorporated herein by reference.

TECHNICAL FIELD

This patent document generally relates to a pouch for a secondary battery and a secondary battery including the same. More particularly, this patent document relates to a pouch for a secondary battery having a sealing portion and a secondary battery including the same.

BACKGROUND

The rapid growth of electric vehicles and portable devices, such as camcorders, mobile phones, and laptop computers, has brought increasing demands for secondary battery which can be charged and discharged repeatedly. Battery packs that include secondary batteries are being developed and applied to a power source of an eco-friendly vehicle.

Examples of the secondary batteries include lithium secondary batteries, nickel-cadmium batteries, and nickel-hydrogen batteries. The lithium secondary batteries are now being widely used due to their high operational voltage and energy density per unit weight, a high charging rate, a compact dimension, etc.

A lithium secondary battery may include an electrode assembly including a cathode, an anode and a separation layer (separator), and an electrolyte immersing the electrode assembly. The lithium secondary battery may further include an outer case having, e.g., a pouch shape.

Gas generation from the electrode assembly and/or the electrolyte included in the lithium secondary batteries is a common phenomenon that results from continuous charge/discharge repetition. For example, a lithium salt such as $LiPF_6$ or $LiBF_4$ in the electrolyte may react with a trace amount of an anion contained in the electrolyte to generate a free gas such as hydrofluoric acid or hydrochloric acid.

SUMMARY

The technology disclosed in this patent document can be implemented in some embodiments to provide a pouch for a secondary battery having improved operational reliability and stability.

The technology disclosed in this patent document can also be implemented in some embodiments to provide a secondary battery having improved operational reliability and stability.

A pouch for a secondary battery implemented based on some embodiments of the disclosed technology includes a pouch cup having a battery cell accommodating portion, a tab receiving portion formed at one end portion of the pouch cup to be in communication with one end of the battery cell accommodating portion, a supporting portion adjacent to the tab receiving portion at the one end portion of the pouch cup to be separated from the battery cell accommodating portion and the tab receiving portion, the supporting portion including a plurality of columns therein, and a reinforcing film attached on an outer wall of the supporting portion, the reinforcing film having a material different from that of the outer wall of the supporting portion.

In some embodiments, the reinforcing film may serve as a fusion film between the outer wall of the supporting portion and the columns.

In some embodiments, the reinforcing film may include an amorphous polyolefin.

In some embodiments, the columns may have a hollow structure.

In some embodiments, the columns may be coupled to the outer wall of the supporting portion to form a vacuum state.

In some embodiments, the outer wall and the columns may be configured to be spaced apart by a gas entering from the battery cell accommodating portion so that the vacuum state is released.

In some embodiments, the columns may have a polygonal column shape.

In some embodiments, wherein the columns may be arranged in a honeycomb shape.

In some embodiments, the columns may form a plurality of column rows within the supporting portion.

In some embodiments, heights of the column rows may sequentially decrease as a distance from the battery cell accommodating portion increases.

In some embodiments, the pouch cup may include a first pouch cup and a second pouch cup. The battery cell accommodating portion may include a first battery cell accommodating portion and a second battery cell accommodating portion formed in the first pouch cup and the second pouch cup, respectively. The tab receiving portion may include a first tab receiving portion and a second tab receiving portion formed in the first pouch cup and the second pouch cup, respectively. The supporting portion may include a first supporting portion and a second supporting portion formed in the first pouch cup and the second pouch cup, respectively. The reinforcing film may include a first reinforcing film and a second reinforcing film attached to outer walls of the first supporting portion and the second supporting portion, respectively.

In some embodiments, the first pouch cup and the second pouch cup may be combined such that the first battery cell accommodating portion and the second battery cell accommodating portion may face each other, the first tab receiving portion and the second tab receiving portion may face each other, and the first supporting portion and the second supporting portion may face each other.

In some embodiments, one end of the first reinforcing film may be located on at least a portion of an outer surface of the first battery cell accommodating portion, and one end of the second reinforcing film may be located on at least a portion of an outer surface of the second battery cell accommodating portion.

A secondary battery according to embodiments of the disclosed technology includes the pouch for a secondary battery according to embodiments as described above, and a battery cell accommodated in the pouch for the secondary battery.

A pouch for a secondary battery pouch according to exemplary embodiments of the disclosed technology may include a battery cell accommodating portion, a tab receiving portion, and a supporting portion, and the supporting portion may be adjacent to the tab receiving portion and may have a space separated from the tab receiving portion. In exemplary embodiments, mechanical stability of the pouch for a secondary battery may be increased by including the support portion.

In exemplary embodiments, a sequential communication between the supporting portion and the battery cell accommodating portion may be induced by a reinforcing film attached to an outer wall of the supporting portion. Accordingly, an increase in the pressure at an inside of the pouch may be delayed in a stepwise manner, and life-span of the pouch and the secondary battery may be enhanced.

DETAILED DESCRIPTION

The technology disclosed in this patent document can be implemented in some embodiments to provide a pouch for a secondary battery including a pouch cup and a supporting portion is disclosed. According to exemplary embodiments, A secondary battery including the pouch for a secondary battery is also provided.

Hereinafter, examples of various aspects of the disclosed technology are described with reference to the accompanying drawings.

Figure 1:
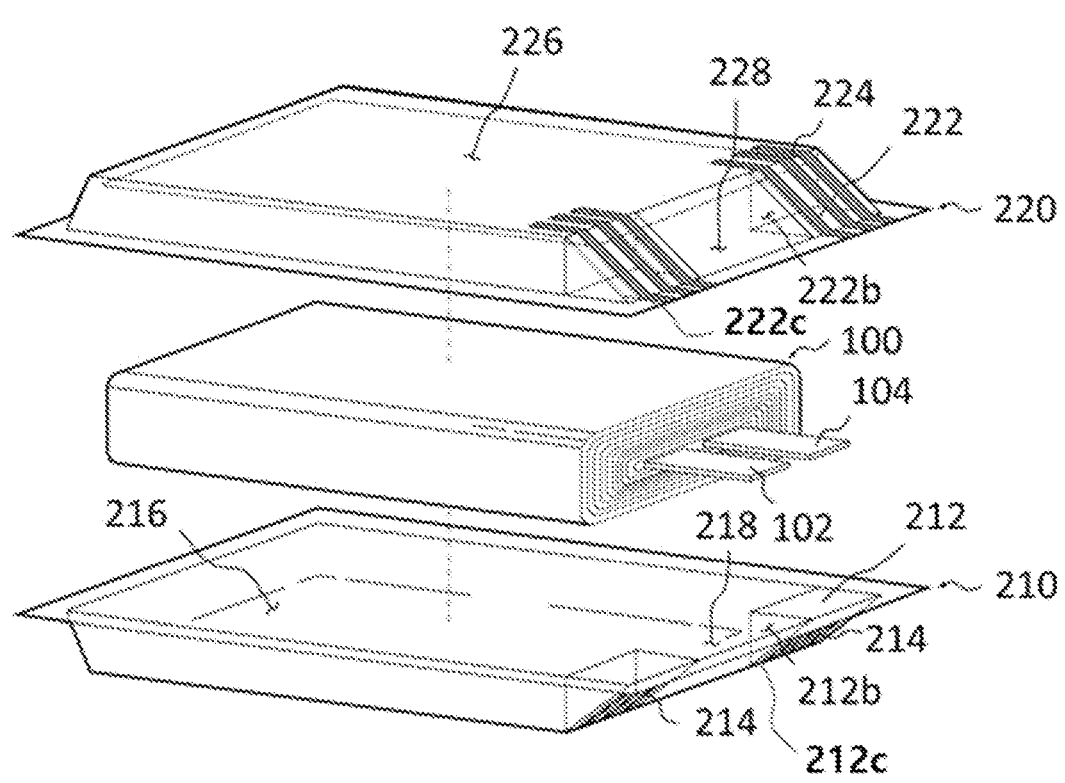
FIG. 1 is a schematic perspective view illustrating a secondary battery including a pouch for a secondary battery based on some embodiments of the disclosed technology.
Figure 2:
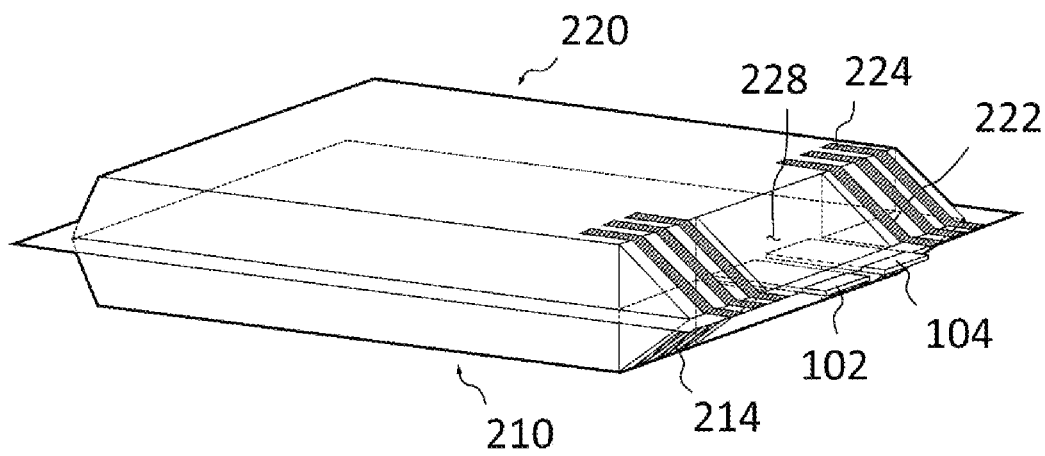
FIG. 2 is a schematic perspective view illustrating a secondary battery including a pouch for a secondary battery based on some embodiments of the disclosed technology.

FIGS. 1 and 2 are schematic perspective views illustrating a secondary battery including a pouch for a secondary battery in accordance with exemplary embodiments. For example, FIG. 1 is an exploded perspective view of a secondary battery. FIG. 2 is a perspective view illustrating a secondary battery in a sealed state of the pouch for a secondary battery of in FIG. 1.

Hereinafter, a pouch for a secondary battery and a secondary battery implemented based on some embodiments of the disclosed technology will be described together with reference to FIGS. 1 and 2.

In FIG. 1, for convenience of descriptions, a first pouch cup 210 and a second pouch cup 220 are illustrated as being separated from each other, but the first pouch cup 210 and the second pouch cup 220 may be integrally connected to each other. For convenience of descriptions, illustration of a battery cell 100 is omitted in FIG. 2.

Referring to FIGS. 1 and 2, a pouch for a secondary battery (hereinafter, referred to as "pouch") based on some embodiments may include a first pouch cup 210 and a second pouch cup 220. The first pouch cup 210 and the second pouch cup may have substantially the same shape. In some embodiments, the secondary battery may include the battery cell 100 accommodated in the pouch.

The battery cell 100 may include an electrode assembly. The electrode assembly may include a plurality of electrodes stacked on top of one another with separation layers being disposed between the electrodes. Each of the electrodes may include an active material layer formed on an electrode current collector.

The electrodes may include an anode and a cathode. The electrode current collector may include a cathode current collector included in the cathode and an anode current collector included in the anode. The active material layer may include a cathode active material layer included in the cathode and an anode active material layer included in the anode.

The cathode may include the cathode current collector and the cathode active material layer formed by coating a cathode active material on the cathode current collector. The cathode active material may include a compound capable of reversibly intercalating and de-intercalating lithium ions. In this case, the secondary battery may be provided as a lithium secondary battery.

In some embodiments, the cathode active material may include lithium-transition metal composite oxide particles. Examples of the lithium-transition metal composite oxide contained in the lithium-transition metal composite oxide particles may include a lithium-manganese oxide, a lithium-cobalt-based oxide, a lithium-nickel-based oxide, a lithium-manganese-cobalt-based oxide, etc. In some embodiments, the lithium-transition metal composite oxide particles may include nickel (Ni), and may further include at least one of cobalt (Co) and manganese (Mn).

For example, the lithium-transition metal composite oxide particles may be represented by Chemical Formula 1 below.

$$Li_xNi_{1-y}M_yO_{2-z}X_z \qquad \text{[Chemical Formula 1]}$$

In Chemical Formula 1, $0.9 \leq x \leq 1.1$, $0 \leq y \leq 0.7$, and $-0.1 \leq z \leq 0.1$. M may represent at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn or Zr. X may represent at least one element selected from O, F, S and P.

In an embodiment, a molar ratio (1-y) of nickel in Chemical Formula 1 may be in a range from 0.8 to 0.95. In this case, power and capacity may be increased using a high-nickel (High-Ni) cathode composition. As a content of nickel included in the cathode active material increases, generation of gas due to a side reaction between the cathode active material and an electrolyte may be increased.

In an embodiment, the lithium-transition metal composite oxide particles may be represented by Chemical Formula 2 below, and may have an olivine structure.

$$LiMPO_4 \qquad \text{[Chemical Formula 2]}$$

In Chemical Formula 2, M may be at least one element selected from Fe, Mn, Ni, Co, and V.

The cathode current collector may include a metallic material that may not be reactive in a charge/discharge voltage range of the lithium secondary battery, and may be easily coated and adhered to the electrode active material. For example, the cathode current collector may include, e.g., stainless steel, nickel, aluminum, titanium, copper, zinc or an alloy thereof, preferably aluminum or an aluminum alloy.

For example, a slurry may be prepared by mixing and stirring the cathode active material with a binder, a conductive material and/or a dispersive agent in a solvent. The slurry may be coated on the cathode current collector, and then dried and pressed to form the cathode including the cathode active material layer The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode may include the anode current collector and the anode active material layer formed by coating the anode active material on the anode current collector.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, a silicon (Si)-based compound, etc., may be used.

The amorphous carbon may include a hard carbon, cokes, a mesocarbon microbead (MCMB), a mesophase pitch-based carbon fiber (MPCF), etc.

The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, indium, etc.

In an embodiment, the anode active material may include the silicon-based active material to provide a high-capacity lithium secondary battery. The silicon-based active material may include SiOx (0<x<2) or SiOx (0<x<2) containing a lithium compound. SiOx containing the Li compound may be SiOx containing a lithium silicate. The lithium silicate may be present in at least a portion of an SiOx (0<x<2) particle. For example, lithium silicate may be present at an inside and/or on a surface of the SiOx (0<x<2) particle. In an embodiment, the lithium silicate may include $Li_2SiO_3$, $Li_2Si_2O_5$, $Li_4SiO_4$, $Li_4Si_3O_8$, etc.

The silicon-based active material may include, e.g., a silicon-carbon composite compound such as silicon carbide (SiC).

The anode current collector may include gold, stainless steel, nickel, aluminum, titanium, copper or an alloy thereof, preferably may include copper or a copper alloy.

For example, a slurry may be prepared by mixing and stirring the anode active material with a binder, a conductive material and/or a dispersive agent in a solvent. The slurry may be coated on the anode current collector, and then dried and pressed to form the anode including the anode active material layer.

The binder and the conductive material substantially the same as or similar to those used for forming the cathode may be used in the anode. In some embodiments, the binder for forming the anode may include, e.g., an aqueous binder such as styrene-butadiene rubber (SBR) for compatibility with the carbon-based active material, and may be used together with a thickener such as carboxymethyl cellulose (CMC).

The separation layer may be interposed between the cathode and the anode. The separation layer 140 include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer may also include a non-woven fabric formed from a glass fiber with a high melting point, a polyethylene terephthalate fiber, or the like.

In exemplary embodiments, an electrode cell may be defined by the cathode, the anode and the separation layer, and a plurality of the electrode cells may be stacked to form the electrode assembly.

The battery cell may be accommodated together with an electrolyte in the pouch for a secondary battery according to exemplary embodiments to define the secondary battery. In exemplary embodiments, a non-aqueous electrolyte may be used as the electrolyte.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

The electrode current collector may include a notched portion (not illustrated). The notched portion may serve as, e.g., an electrode tab. The notched portion may include a cathode notched portion protruding from the cathode current collector and an anode notched portion protruding from the anode current collector.

Electrode leads 102 and 104 may be electrically connected to the notched portions, and may be exposed to an outside of the pouch. The electrode leads 102 and 104 may serve as external connection leads for applying a power to the secondary battery. The electrode leads may include a cathode lead 102 and an anode lead 104.

In an embodiment, the cathode lead 102 and the anode lead 104 may be disposed at both opposite sides of the secondary battery. In an embodiment, the cathode lead 102 and the anode lead 104 may be fused together at one side of the pouch.

Each pouch cup of the pouch for a secondary battery according to exemplary embodiments may include an inner resin layer and an outer resin layer.

In some embodiments, the inner resin layer may include a polyolefin resin, a copolymer of ethylene and an acrylic acid, a copolymer of propylene and an acrylic acid, etc. Examples of the polyolefin resin may include unstretched polypropylene, polypropylene-butylene-ethylene terpolymer, polypropylene, a chlorinated polypropylene (CPP) resin, polyethylene, ethylene propylene copolymer, etc. The inner resin layer may include a polymer resin having enhanced electrolyte resistance.

The outer resin layer may have a single-layered structure or a multi-layered structure including, e.g., polyethylene, polypropylene, polyethylene terephthalate, nylon, a low density polyethylene (LDPE), a high density polyethylene (HDPE), a linear low density polyethylene (LLDPE), etc. The outer resin layer may be laminated on the inner resin layer to prevent a direct exposure of the inner resin layer.

Each thickness of the inner resin layer or the outer resin layer may be from 5 μm to 100 μm, e.g., from 10 μm to 80 μm.

The pouch for a secondary battery pouch based on some embodiments of the disclosed technology includes a tab receiving portion 218 and 228 communicating with one end of the battery cell accommodating portion 216 and 226, and a supporting portion having a space separated or divided from the tab receiving portion 218 and 228.

In some embodiments, the supporting portion may include two or more first supporting portions 212 and two or more second supporting portions 222.

In an embodiment, a pair of the first supporting portions 212 may be disposed to be spaced apart from each other with the first tab receiving portion 218 interposed therebetween. For example, the first supporting portion 212 may be disposed at each of both sides of the first tab receiving portion 218.

In an embodiment, a pair of the second supporting portions 222 may be disposed to be spaced apart from each other with the second tab receiving portion 228 interposed therebetween. For example, the second supporting portion 222 may be disposed at each of both sides of the second tab receiving portion 228.

The first supporting portion 212 and the second supporting portion 222 may face each other in a thickness direction. In some embodiments, at least a portion of a top surface of the first support portion 212 and at least a portion of a bottom surface of the second supporting portion 222 may contact each other.

The first supporting portion 212 may have a space (e.g., a first space) separated from the first tab receiving portion 218 and the first battery cell accommodating portion 216 by a first inner wall 212b. The second supporting portion 222 may have a space (e.g., a second space) separated from the second tab receiving portion 228 and the second battery cell accommodating portion 226 by a second inner wall 222b.

If a plurality of the first supporting portions 212 and a plurality of the second supporting portions 222 are included, at least one of the first supporting portions 212 and at least one of the second supporting portions 222 may face each other in the thickness direction. The first pouch cup 210 and the second pouch cup 220 may be aligned and coupled with each other so that the first supporting portion 212 and the second supporting portion 222 may contact or face each other.

The electrode leads 102 and 104 may not be in contact with the first supporting portion 212 and the second supporting portion 222, and may be partially disposed in the tab receiving portion 218 and 228 to protrude to an outside of the pouch.

In some embodiments, the pouch may include one first supporting portion 212 and one second supporting portion 222.

In this case, the first supporting portion 212 may be disposed under the first tab receiving portion 218 so that a top surface of the first supporting portion 212 may contact a bottom surface of at least one of the electrode leads 102 and 104. The second supporting portion 222 may be disposed on the second tab receiving portion 228 so that the bottom surface of the second supporting portion 222 may contact a top surface of at least one of the electrode leads 102 and 104.

For example, the top surface of the first supporting portion 212 may be in contact with the bottom surfaces of the supporting portion 222 and the electrode lead 102 and 104. The bottom surface of the second supporting portion 222 may be in contact with the top surfaces of the first supporting portion 212 and the electrode lead 102 and 104.

In some embodiments, the first supporting portion 212 may be disposed at each of a front end portion and a rear end portion in a length direction of the pouch. For example, the top surface of the first supporting portion 212 disposed at the front end portion may be in contact with or adjacent to the electrode lead 102 and 104. The second supporting portion 222 may be disposed to be symmetrical with the first supporting portion 212 in the thickness direction.

If the electrode leads 102 and 104 are located at opposite sides (e.g., the front end portion and the rear end portion), one of the plurality of the first supporting portions 212 may be in contact with or adjacent to the anode lead 102, and the other one may be in contact with or adjacent to the anode lead 104. The second supporting portion 222 may be disposed to be symmetrical with the first supporting portion 212 in the thickness direction.

In exemplary embodiments, the pouch for a secondary battery may include a reinforcing film 214 and 224 attached to an outer wall 212c and 222c of the supporting portion 212 and 222. The reinforcing film 214 and 224 may include a different material from that of the outer wall 212c and 222c. The outer wall 212c and 222c may be a part of the pouch cup 210 and 220.

The reinforcing films 214 and 224 may include a first reinforcing film 214 and a second reinforcing film 224 attached on the outer wall 212c of the first supporting portion 212 and the outer wall 222c of the second supporting portion 222, respectively.

One end of the first reinforcing film 214 may be located on at least a portion of an outer bottom surface of the first battery cell accommodating portion 216, and one end of the second reinforcing film 224 may be located on at least a portion of an outer top surface of the second battery cell accommodating portion 226.

In some embodiments, the reinforcing film 214 and 224 may be provided as a film that may fuse the outer walls 212c and 222c of the supporting portions 212 and 222 and columns 222a (see, e.g., FIG. 3) with each other.

In some embodiments, the reinforcing film 214, 224 may include an amorphous polyolefin. Preferably, the amorphous polyolefin may be an amorphous polypropylene. In this case, the reinforcing film 214 and 224 may be easily adhered to the supporting portions 212 and 222 through a simple process.

As illustrated in FIGS. 1 and 2, a plurality of first reinforcing films 214 (e.g., six first reinforcing films) may be formed on an outer surface of the first pouch cup 210, e.g., the outer wall of the supporting portion 212 to be spaced apart from each other.

A plurality of the second reinforcing films 224 (e.g., six second reinforcing films) may be formed on an outer surface of the second pouch cup 220, e.g., the outer wall of the supporting portion 222 to be spaced apart from each other.

The first reinforcing film 214 and the second reinforcing film 224 may disperse a pressure applied to each of the first supporting portion 212 and the second supporting portion 222 from the inside of the battery cell accommodating portions 216 and 226 in a short axis direction.

Thus, a spacing between the outer wall of the first supporting portion 212 and first columns to be described later or a spacing between the outer wall of the second supporting portion 222 and the second columns 222a may be stably maintained.

In some embodiments, each length of the first reinforcing film 214 and the second reinforcing film 224 may be greater than a length of the outer wall of the first supporting portion 212 or the second supporting portion 222 (e.g., a length of a lateral side of the outer wall).

Accordingly, the reinforcing film 214 and 224 may extend on the outer surface of the battery cell receiving portions 216 and 226 of the pouch cups 216 and 226, the outer wall of the supporting portions 212 and 222, and an end portion of the pouch cups 210 and 220. Thus, mechanical stability of the first outer wall 212c may be further increased in a long axis direction by the first reinforcing film 214, and mechanical stability of the second outer wall 222c may be further increased in the long axis direction by the second reinforcing film 224.

Further, when the pressure applied to the first supporting portion 212 and the second supporting portion 222 from the inside of the battery cell accommodating portions 216 and 226, respectively, may be dispersed in a stepwise manner until the first supporting portion 212 and the second supporting portion 222 may be completely vented.

Additionally, the spacing between the supporting portions 212 and 222 and the pouch cups 210 and 220 may be uniformly induced from a first row of columns to be described later, and a pressure change at the inside of the pouch may be effectively delayed.

An insulating member (not illustrated) may be wound around a portion of each of the electrode leads 102 and 104 to prevent an electrical short circuit.

For convenience of illustration, the electrode assembly included in the battery cell 100 is illustrated as a wound-around type in FIG. 1, but the electrode assembly may have, e.g., a stacked shape or a folded jelly-roll shape.

As described above, the first pouch cup 210 and the second pouch cup 220 may be a single or unitary member integrally connected to each other. In this case, an area of a sealing surface or a bonding surface of the first pouch cup 210 and the second pouch cup 220 may be reduced.

If the first pouch cup 210 and the second pouch cup 220 are an integral member, a connecting region of the pouch cups 210 and 220 may be formed at any one side of each pouch cup 210 and 220.

The first supporting portion 212 and the second supporting portion 222 may be formed of the same material as that of the above-described inner resin layer. For example, the supporting portions 212 and 222 may include a polyolefin resin, a copolymer of ethylene and an acrylic acid, a copolymer of propylene and an acrylic acid, etc. Examples of the polyolefin resin may include unstretched polypropylene, polypropylene-butylene-ethylene terpolymer, polypropylene, a chlorinated polypropylene (CPP) resin, polyethylene, ethylene propylene copolymer, etc.

Figure 3:
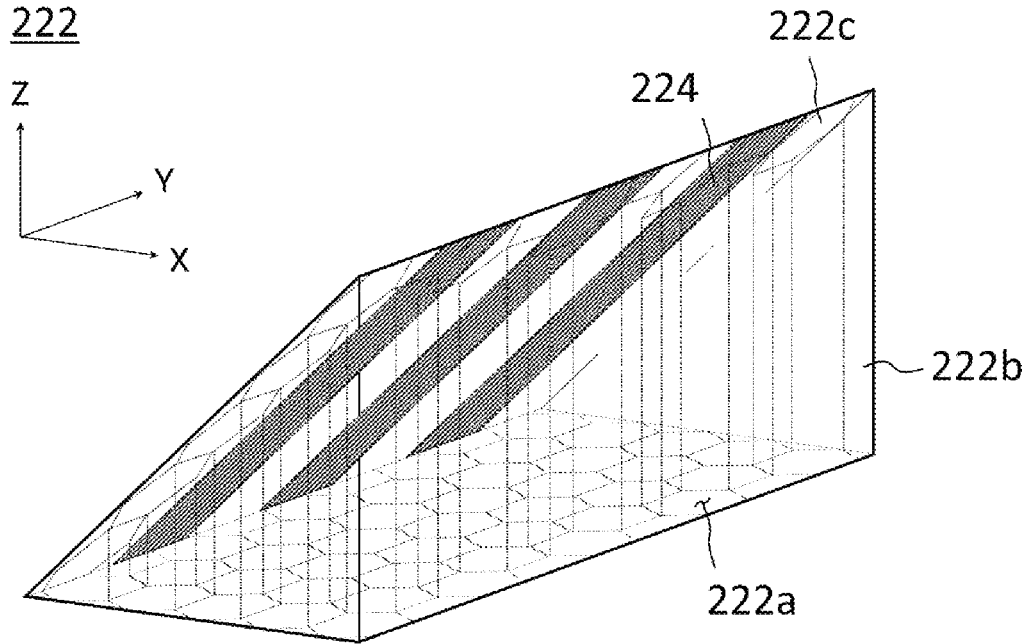
FIG. 3 is a schematic perspective views illustrating a second supporting portion based on some embodiments of the disclosed technology.
Figure 4:
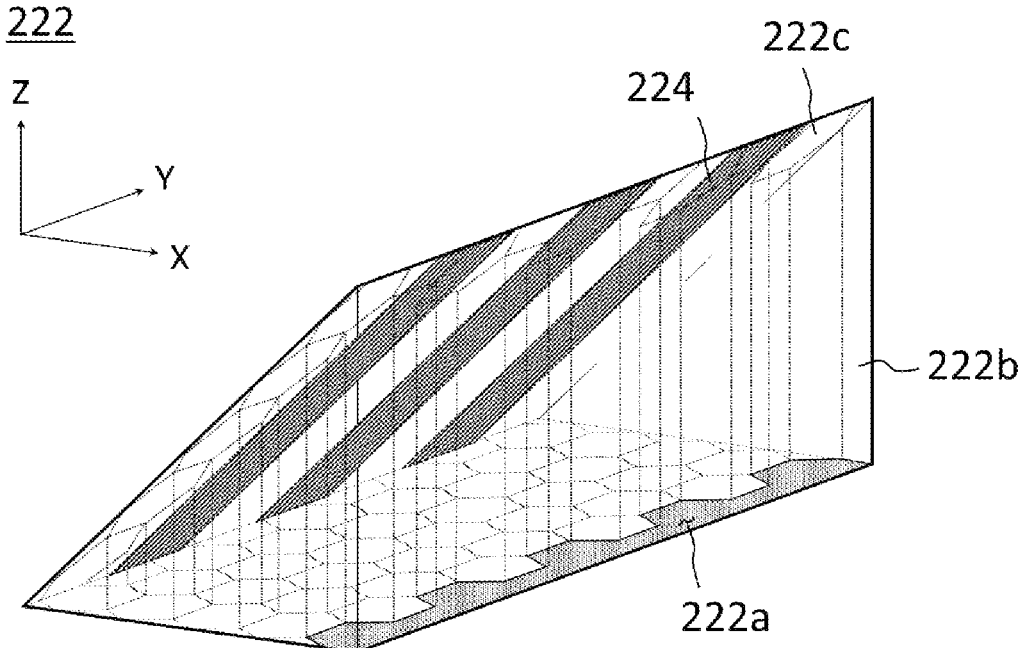
FIG. 4 is a schematic perspective views illustrating a second supporting portion based on some embodiments of the disclosed technology.
Figure 5:
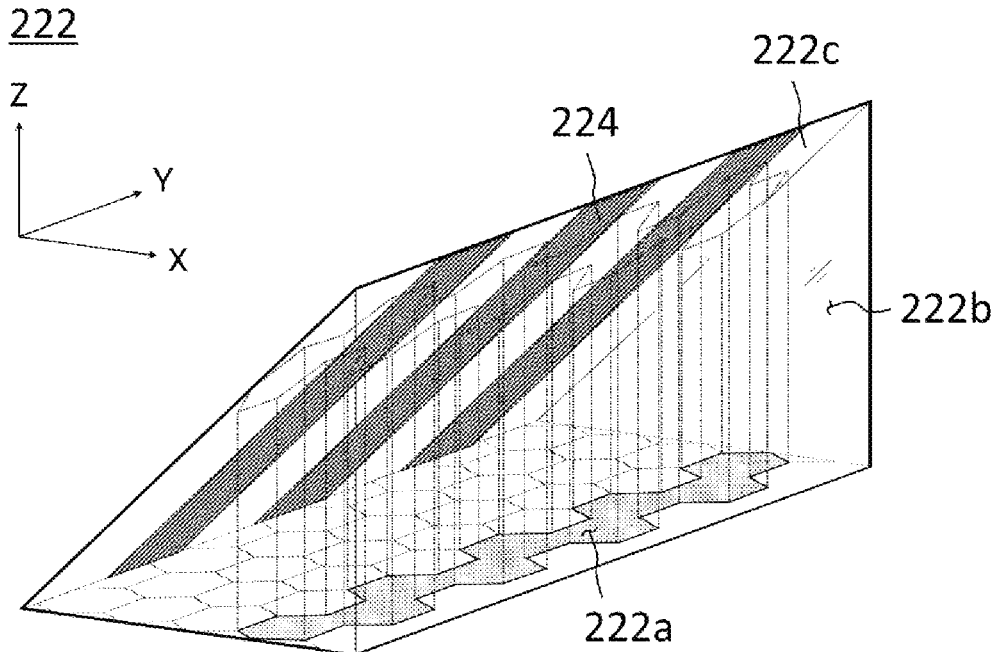
FIG. 5 is a schematic perspective views illustrating a second supporting portion based on some embodiments of the disclosed technology.

FIGS. 3 to 5 are schematic perspective views illustrating a second supporting portion in accordance with exemplary embodiments. For convenience of explanation, FIGS. 3 to 5 provide perspective views of the second supporting portion, and the first supporting portion may have a structure and a shape substantially the same or similar to those of the second supporting portion Referring to FIGS. 3 to 5, the second supporting portion 222 may include at least one second column 222a and at least one pressing pattern 222c.

For example, a plurality of the second columns 222a may be included in the second supporting portion 222, and a bottom surface of each of the second columns 222a may have a polygonal shape. The second column 222a may have a hollow structure.

As illustrated in FIG. 3, in some embodiments, the second column 222a may have a hexagonal cross-section. In this case, an external force applied to the second supporting portion 222 may be more easily dispersed or absorbed, and mechanical stability of the pouch may be further improved.

If a plurality of the second columns 222a are included in the second supporting portion 222, the second columns 222a may have the same shape.

In an embodiment, the second columns 222a may have different shapes. For example, some of the second columns 222a may have a rectangular cross-section, and others of the second columns 222a may have a triangular cross-section.

As illustrated in FIG. 3, the second columns 222a may form a honeycomb structure. Accordingly, the external force applied to the second supporting portion 222 may be more easily dispersed or absorbed, and mechanical stability of the pouch may be further improved.

An inner space partitioned by the second column may be a vacuum.

For example, a through hole may be connected to an outside of the pouch cup, and an inner space of the column may be vacuum-treated. Thereafter, the inner space of the column may be vacuum-treated by sealing the through hole.

In some embodiments, a plurality of the second columns 222a may be arranged in a Y-direction to form a column row, and the plurality of column rows may be arranged along an X-direction. A height of the column rows may sequentially decrease as a distance from the battery cell accommodating portion 216 increases.

As illustrated in FIG. 4, the shaded second columns 222a (e.g., the first column row) may have a 22-gonal cross-section.

As illustrated in FIG. 5, a second column row including the shaded second columns 222a may have a 38-gonal cross-section.

The first column row indicated in FIG. 4 may be in an integral communication with the second battery cell accommodating portion 226 by an action of the second reinforcing film 224, and the second column row indicated in FIG. 5 may also be in an integral communication with the second battery cell accommodating portion 226 by an action of the second reinforcing film 224.

The communication of the first column row and the communication of the second column row may be sequentially performed. For example, communications from the first column row to the fifth column row illustrated in FIGS. 4 and 5 may be sequentially performed.

Accordingly, a pressure change at the inside of the pouch may be delayed in a stepwise manner, and life-span stability of the secondary battery may be improved.

Only examples of certain embodiments of the disclosed technology are provided above. Variations or enhancements of the disclosed embodiments and other embodiments may be made based on what is disclosed or illustrated in this patent document.

What is claimed is:

1. A pouch for a secondary battery, comprising:
   a pouch cup including a battery cell accommodating portion structured to accommodate a battery cell;
   a tab receiving portion formed at one end portion of the pouch cup to be in communication with one end of the battery cell accommodating portion;
   a supporting portion adjacent to the tab receiving portion at the one end portion of the pouch cup to be separated from the battery cell accommodating portion and the tab receiving portion, the supporting portion comprising a plurality of columns in the supporting portion; and a reinforcing film attached on an outer wall of the supporting portion, the reinforcing film including a material different from that of the outer wall of the supporting portion, wherein the outer wall is a part of the pouch cup, and the reinforcing film serves as a fusion film between the outer wall of the supporting portion and the columns, wherein the columns have a hollow structure and are coupled to the outer wall of the supporting portion to form a vacuum state, and wherein the outer wall and the columns are spaced apart by a gas entering from the battery cell accommodating portion so that the vacuum state is released, wherein a pair of supporting portions are disposed to be spaced apart from each other with the tab receiving portion interposed therebetween, and each of the supporting portions has a space separated from the tab receiving portion and the battery cell accommodating portion by an inner wall.

2. The pouch for a secondary battery according to claim 1, wherein the reinforcing film comprises an amorphous polyolefin.

3. The pouch for a secondary battery of claim 1, wherein the columns have a polygonal column shape.

4. The pouch for a secondary battery of claim 3, wherein the columns are arranged in a honeycomb shape.

5. The pouch for a secondary battery of claim 3, wherein the columns form a plurality of column rows within the supporting portion.

6. The pouch for a secondary battery of claim 5, wherein heights of the column rows sequentially decrease as a distance from the battery cell accommodating portion increases.

7. The pouch for a secondary battery of claim 1, wherein the pouch cup comprises a first pouch cup and a second pouch cup, the battery cell accommodating portion comprises a first battery cell accommodating portion formed in the first pouch cup and a second battery cell accommodating portion formed in the second pouch cup, the tab receiving portion comprises a first tab receiving portion formed in the first pouch cup and a second tab receiving portion formed in the second pouch cup, the supporting portion comprises a first supporting portion formed in the first pouch cup and a second supporting portion formed in the second pouch cup, and the reinforcing film comprises a first reinforcing film attached to outer walls of the first supporting portion and a second reinforcing film attached to outer walls of the second supporting portion.

8. The pouch for a secondary battery of claim 7, wherein the first pouch cup and the second pouch cup are combined such that the first battery cell accommodating portion and the second battery cell accommodating portion face each other, the first tab receiving portion and the second tab receiving portion face each other, and the first supporting portion and the second supporting portion face each other.

9. The pouch for a secondary battery of claim 8, wherein one end of the first reinforcing film is located on at least a portion of an outer surface of the first battery cell accommodating portion, and one end of the second reinforcing film is located on at least a portion of an outer surface of the second battery cell accommodating portion.

10. A secondary battery, comprising:

a pouch for a secondary battery; and a battery cell accommodated in the pouch for the secondary battery, wherein the pouch for the secondary battery comprises:

a pouch cup including a battery cell accommodating portion structured to accommodate a battery cell;

a tab receiving portion formed at one end portion of the pouch cup to be in communication with one end of the battery cell accommodating portion;

a supporting portion adjacent to the tab receiving portion at the one end portion of the pouch cup to be separated from the battery cell accommodating portion and the tab receiving portion, the supporting portion comprising a plurality of columns in the supporting portion; and a reinforcing film attached on an outer wall of the supporting portion, the reinforcing film including a material different from that of the outer wall of the supporting portion, wherein the outer wall is a part of the pouch cup, and the reinforcing film serves as a fusion film between the outer wall of the supporting portion and the columns, wherein the columns have a hollow structure and are coupled to the outer wall of the supporting portion to form a vacuum state, and wherein the outer wall and the columns are spaced apart by a gas entering from the battery cell accommodating portion so that the vacuum state is released, wherein a pair of supporting portions are disposed to be spaced apart from each other with the tab receiving portion interposed therebetween, and each of the supporting portions has a space separated from the tab receiving portion and the battery cell accommodating portion by an inner wall.

11. The secondary battery according to claim 10, wherein the reinforcing film serves as a fusion film between the outer wall of the supporting portion and the columns.

12. The secondary battery according to claim 10, wherein the reinforcing film comprises an amorphous polyolefin.

13. The secondary battery of claim 10, wherein the columns have a hollow structure.

14. The secondary battery according to claim 13, wherein the columns are coupled to the outer wall of the supporting portion to form a vacuum state.

15. The secondary battery according to claim 14, wherein the outer wall and the columns are spaced apart by a gas entering from the battery cell accommodating portion so that the vacuum state is released.

16. The secondary battery of claim 15, wherein the columns have a polygonal column shape.

* * * * *